June 24, 1969     N. B. HANSON     3,451,566

AUGER CONSTRUCTION FOR SILO UNLOADERS

Filed March 13, 1967     Sheet _1_ of 2

INVENTOR.
NEWELL B. HANSON
BY Merchant & Gould
ATTORNEYS

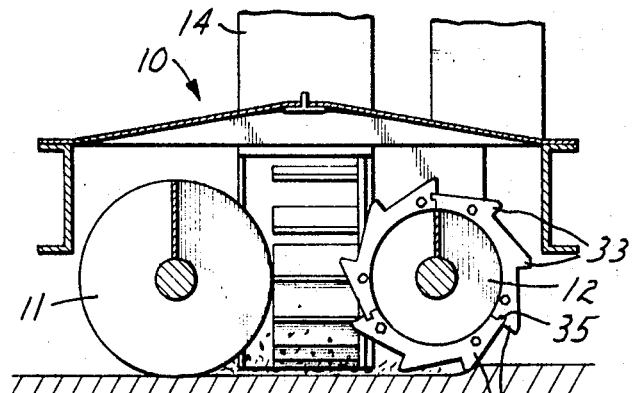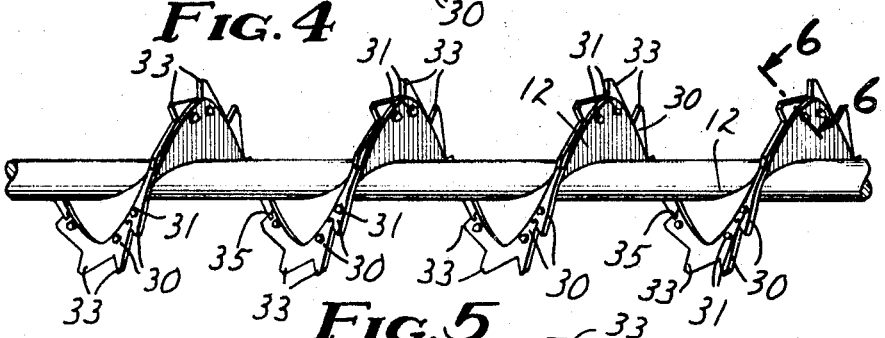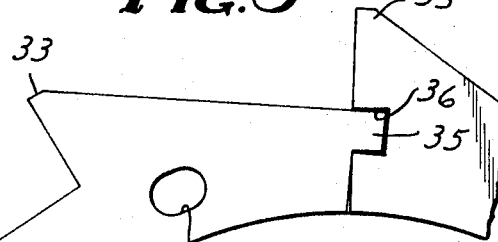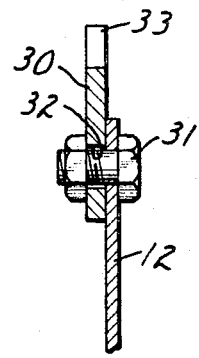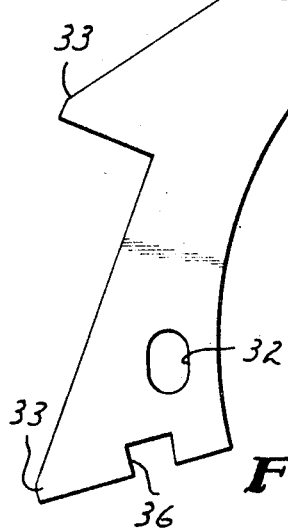
INVENTOR.
NEWELL B. HANSON
BY Merchant & Gould
ATTORNEYS

United States Patent Office 3,451,566
Patented June 24, 1969

3,451,566
AUGER CONSTRUCTION FOR SILO UNLOADERS
Newell B. Hanson, Lake Lillian, Minn., assignor to Hanson Silo Company, Lake Lillian, Minn., a corporation of Minnesota
Filed Mar. 13, 1967, Ser. No. 622,555
Int. Cl. B65g 65/46
U.S. Cl. 214—17                              2 Claims

ABSTRACT OF THE DISCLOSURE

A silo unloader including a pair of parallel, oppositely rotating elongated augers adapted to engage the upper surface of the silage and to gather, cut, and loosen silage between said parallel augers and move the silage axially of said augers into a blower which transports the silage to the exterior of the silo. The forward most auger of the pair of augers has removable teeth attached adjacent the silage engaging edge so that the teeth extend therefrom and cut and loosen silage. The teeth are constructed to interlock for added strength, and to follow the contours of the auger. Additional wheels having radially outwardly projecting teeth thereon are mounted at the outer most end of each of the augers to cut and loosen silage adjacent the wall of the silo and urge it inwardly toward the augers.

BACKGROUND OF THE INVENTION

Field of the invention

In the use of silage stored in vertically elongated cylindrical silos, it is now common practice to place an entire machine, including horizontal augers and a blower, in the silo at the top of the silage. This machine gradually works its way to the bottom of the silo by blowing the silage to a point at the exterior of the silo where it may be readily used. In general, silage is an extremely wet material and has a tendency to freeze into a relatively solid mass, easily. Because the silage is a fibrous mass, when it freezes, it forms an extremely tough material which is very difficult to handle. Because the frozen silage is extremely tough, augers and the like have a tendency to ride over the surface thereof rather than cut into the mass.

Description of the prior art

There are primarily two types of prior art, the type described in Patent No. 2,801,137, issued on July 30, 1957, and the type described in Patent No. 3,199,690, issued on Aug. 10, 1965. In general, the machine described in Patent No. 2,801,137 includes a pair of parallel oppositely rotating elongated augers, the forward most one of which has teeth fixedly attached thereto. In general, these teeth are attached by welding or the like to the outer most edge of the auger and have a tendency to readily break free of the auger. Because the teeth are fixedly attached, it is extremely difficult to replace the teeth.

The machine described in Patent No. 3,199,690 has a single elongated auger, and a counter-rotating shaft having a plurality of radially projecting cutting and chopping blades affixed thereto. The counter-rotating shaft replaces the front auger, and the blades are constructed to throw the cut and chopped silage onto the auger. While the blades on the counter-rotating shaft of this machine may be replaceable, the entire forward auger must be removed and replaced with the counter-rotating shaft and blades if a machine having a pair of parallel, oppositely rotating elongated augers was originally purchased. That is, it is expensive to convert a machine of the type described in Patent No. 2,801,137 to a machine of the type described in Patent No. 3,199,690.

Summary of the invention

The present invention pertains to an improved auger construction for silo unloaders, and more specifically to an auger having removable toothed members attached thereto adjacent the silage engaging edge thereof.

The present invention is especially adapted for a silo unloader of the type including a pair of parallel, oppositely rotating elongated augers, but may be utilized on augers included in other types of machinery and includes a plurality of toothed members removably attached adjacent the outer silage engaging edge of the forward auger with each toothed member generally following the contour of the auger and having at least one outwardly projecting tooth thereon. The toothed members are constructed with interlocking portions thereon so that adjacent members interlock to strengthen the entire assembly and prevent movement or rotation of a single member.

It is an object of the present invention to provide a new and improved auger construction for silo unloaders.

It is a further object of the present invention to provide toothed members adapted to be attached adjacent the silage engaging edge of an auger.

It is a further object of the present invention to provide toothed members adapted to be attached to augers and including portions which interlock with adjacent members to provide a continuous spiral connected to the outer edge of an auger and having outwardly extending teeth thereon.

These and other objects of this invention will become apparent to those skilled in the are upon consideration of the accompanying specification, claims, and drawings.

Brief description of the drawings

Referring to the drawings, wherein like characters indicate like parts throughout the figures:

FIGURE 4 is an enlarged sectional view as seen from the line 4—4 in FIGURE 1;

FIGURE 5 is a view in side elevation of the auger embodying the present invention;

FIGURE 6 is an enlarged sectional view as seen from the line 6—6 in FIGURE 5; and FIGURE 7 is an enlarged view in side elevation of a toothed member, unattached from an auger, and interlocked in an adjacent member.

Description of the preferred embodiment

Figure 1:
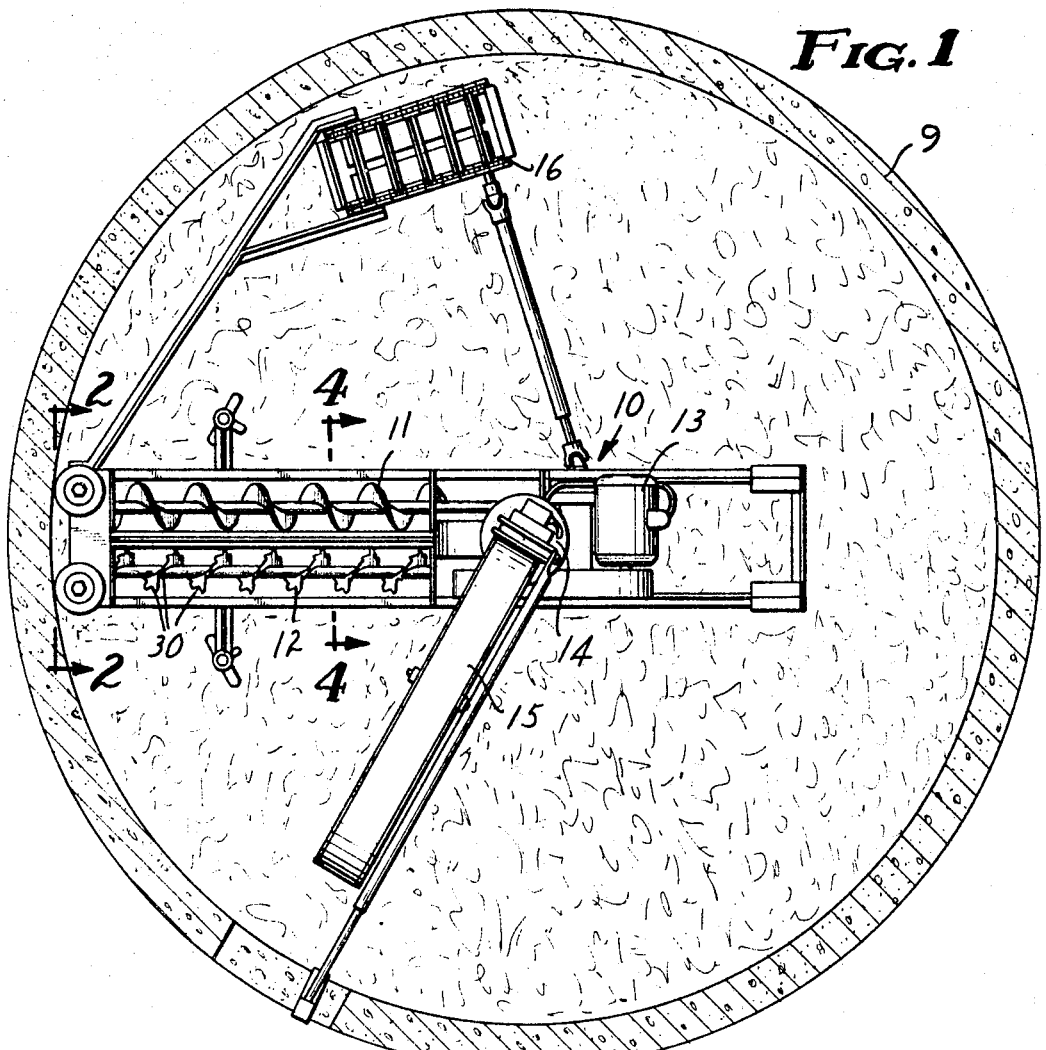
FIGURE 1 is a view in horizontal section of a silo having a silo unloader embodying the present invention operatively positioned therein, some parts removed.
Figures 2, 3:
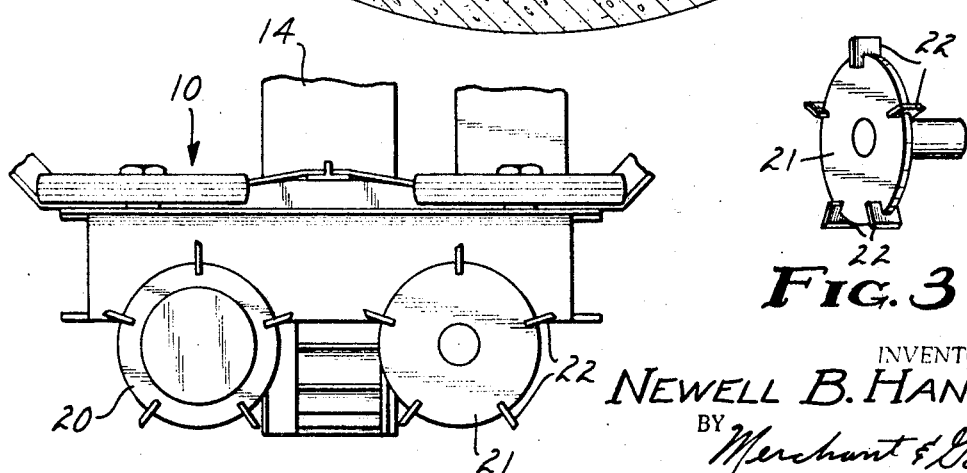
FIGURE 2 is an enlarged end view of the device illustrated in FIGURE 1 as seen from the lines 2—2 in FIGURE 1.
FIGURE 3 is a detailed view in perspective of a chopping wheel attached to the forward auger.

FIGURES 1, 2, and 4 illustrate a silo unloader generally designated 10 operatively mounted in a cylindrical silo 9 and having a first elongated auger 11, and a second elongated auger 12 mounted parallel and juxtaposition to the first auger 11. Referring to FIGURE 4, the first auger 11 rotates in a counterclockwise direction and the second auger 12 rotates in a clockwise direction. The augers 11 and 12 are rotated by a motor 13, which motor 13 also operates a blower system 14 connected to a silage duct 15. The first and second augers 11 and 12 move the silage inwardly toward the blower 14 which transports the silage through the duct 15 to a point external of the silo 9. A crawler-type drive unit 16 rotates the auger assembly about an axis approximately coaxial with the silo 9 in a counter-clockwise direction, referring to FIGURE 1. Thus, the second auger 12 is the lead auger and the first auger 11 follows the auger 12 in rotation around the silo 9.

The first auger 11 has a toothed wheel 20 fixedly attached adjacent the outer most end thereof and the second auger 12 has a toothed wheel 21 fixedly attached adjacent its outer most end, as illustrated in FIGURE 2. The toothed wheel 21 is illustrated in detail in FIGURE 3 where it can be seen that the wheel 21 is generally disc-shaped and the teeth, designated 22, are somewhat paddle-shaped to clean the inner surface of the wall of the silo 9. The toothed wheels 20 and 21 move the silage adjacent the wall of the silo 9 inwardly toward the first and second augers 11 and 12 so that an approximately uniform layer of silage is removed each time the silo unloader 10 makes a complete revolution within the silo 9.

The lead auger 12 has means attached thereto for cutting and loosening silage so that the first auger 11 in cooperation with the lead auger 12 can easily move the silage inwardly to the blower system 14. Specifically, the lead auger 12 has a plurality of toothed members 30 removably attached thereto by some convenient means such as bolts 31 or the like. A portion of the lead auger 12 having a plurality of the toothed members 30 attached thereto is illustrated in FIGURE 5, and a single toothed member 30 interlocked with a portion of a second toothed member 30 is illustrated in the greatly enlarged FIGURE 7. Each of the toothed members 30 is constructed from a generally flat piece of metal having the desired hardness and strength. The toothed members 30 are elongated and generally arcuate in shape with a slight twist therein so that each toothed member 30 forms a section of a spiral. The toothed members 30 are adapted to lie parallel to and in juxtaposition with one surface of the auger 12, and adjacent the outer most silage engaging edge thereof. Each toothed member 30 has a pair of holes 32 therethrough which are adapted to receive the bolts 31 to hold the toothed member 30 rigidly in place against the suface of the auger 12. In this embodiment, each toothed member 30 has three teeth 33 extending radially outwardly therefrom, which teeth 33 are disposed to extend radially outwardly from the outer most silage engaging edge of the auger 12 when the toothed member 30 is correctly positioned thereon. A tongue portion 35 extends outwardly from one end of the toothed member 30 and a mating recess 36 is formed in the other end thereof. The tongue portion 35 of a toothed member 30 is adapted to fit within the mating recess 36 of an adjacent toothed member 30 to interlock all of the toothed members 30 together, as illustrated in FIGURE 7, and add strength thereto as well as continuity. The teeth 33 are positioned on the toothed member 30 so that a continuous row of teeth 33 is formed along the silage engaging edge of the auger 12 when all of the plurality of toothed members 30 are correctly positioned. It should be understood that the present toothed member 30 is a preferred embodiment because of the simplicity of construction and the ease of use. However, many variations could be produced in this embodiment by one skilled in the art, and it is fully intended that all of these should come within the scope of this invention.

Thus, a new and improved auger has been described which cuts and loosens silage for removal by the silo unloader 10. This improvemed auger is much easier to construct, since the toothed members 30 may be attached to a standard auger, and each toothed member 30 is easily replaced in the event any of the teeth 33 are broken. It should be noted that the auger 12 actually has a slightly smaller diameter than the auger 11 so that the total diameter thereof with the toothed members 30 attached is approximately equal to the diameter of the auger 11 for smooth, uniform cutting and movement of the silage by the silo unloader 10. Because of the augering action of the auger 12, the teeth 33 operate to cut and loosen the silage in an improved fashion, and therefore, improve the overall operating characteristics of the silo unloader 10.

While I have shown and described a specific embodiment of this invention, further modifications and improvements will occur to those skilled in the art. I desire it to be understood, therefore, that this invention is not limited to the particular form shown.

I claim:

1. A toothed member adapted to be attached adjacent the silage engaging edge of an auger in a silo unloader for cutting and loosening silage adjacent said auger comprising:
   (a) a body portion having a generally arcuate shape and forming a section of a spiral so that said body portion substantially follows the contours of a portion of an auger adjacent the silage engaging edge thereof;
   (b) said body portion having a tongue shaped portion extending outwardly from one end thereof and adapted to engage a groove in an adjacent toothed member;
   (c) said body portion having a groove formed therein at the other end adapted to receive therein a tongue shaped portion of an adjacent toothed member;
   (d) said body portion further having at least one tooth extending outwardly from the outer edge thereof;
   (e) means associated with said body member for connecting said body member to a spiral shaped surface of an auger so that said one tooth extends outwardly past the silage engaging edge of said auger.

2. In a silo unloader of the type adapted for installation in a silo above the surface of the silage and which includes a pair of parallel, oppositely rotating elongated augers adapted to engage the upper surface of the silage and to gather, cut and loosen silage between said parallel augers and move the silage axially of said augers toward the center of the silo, the improvement comprising:
   (a) a plurality of tooth members each constructed from a generally flat plate and formed into a generally arcuate shape with said member being formed from a flat plane into a section of a spiral so that said members follow the contours of the auger, and each said member having a plurality of generally triangularly shaped teeth extending outwardly from the outer edge thereof;
   (b) said plurality of tooth members being attached adjacent the outer silage engaging edge of the lead auger in a generally continuous line;
   (c) each of said tooth members in addition being constructed to removably interlock with the adjacent members at either end thereof;
   (d) said members being further attached so that the teeth thereon extend outwardly past the silage engaging edge to cut and loosen silage; and
   (e) each of said members being attached to said lead auger so as to be individually removable and replaceable.

References Cited

UNITED STATES PATENTS

| | | | |
|---|---|---|---|
| 2,309,418 | 1/1943 | Schweickart et al. | 198—213 |
| 2,610,739 | 9/1952 | Bitzer | 198—213 X |
| 3,055,649 | 9/1962 | Dretzke et al. | 214—17 |

ROBERT G. SHERIDAN, *Primary Examiner.*

U.S. Cl. X.R.

146—106; 198—213.